United States Patent Office 3,305,493
Patented Feb. 21, 1967

3,305,493
CONDENSATION PRODUCTS AND METHODS OF MAKING THEM
William D. Emmons, Huntingdon Valley, Pa., assignor to Rohm & Haas Company, Philadelphia, Pa., a corporation of Delaware
No Drawing. Filed Dec. 20, 1961, Ser. No. 160,901
8 Claims. (Cl. 260—2)

The present invention is concerned with thermosetting resinous condensates obtained by the reaction of epihalohydrin with certain novel aliphatic amino-amide condensation products. The invention also includes the process of producing the resinous condensation products.

In accordance with the present invention, a chemical intermediate is produced which is a linear polymeric reaction product of a polyalkylenepolyamine, or of mixtures thereof with an alkylenediamine, obtained by reaction with an ester of acrylic acid or methacrylic acid, especially a ($C_1$–$C_4$)-alkyl acrylate, the preferred ester being methyl acrylate from the standpoint of cost and ease of reaction.

It is preferred that the ester and the polyamine be reacted in approximately a 1:1 mol ratio. However, the mol ratio of ester to polyamine may be in the range from 0.5:1 to 1.8:1. When a high mol ratio of the ester to the polyamine is used, it is merely desirable to limit the extent of condensation so that the condensation product of linear character still retains a substantial proportion of basic nitrogen atoms, either in the form of an amino group —$NH_2$ or an imino group —NH—.

A variety of polyalkylenepolyamines including polyethylenepolyamines, polypropylenepolyamines, polybutylenepolyamines, polyamylenepolyamines, poly(hexamethylene)polyamines, and so on may be employed herein of which the polyethylenepolyamines represent an economically preferred class. More specifically, the polyalkylenepolyamines used in this invention are polyamines containing two primary amine groups and at least one secondary amine group in which the nitrogen atoms are linked together by groups of the formula —$C_nH_{2n}$— where $n$ is a small integer greater than unity and the number of such groups in the molecule ranges from two up to about eight and preferably up to about four. The nitrogen atoms may be attached to adjacent carbon atoms in the group —$C_nH_{2n}$— or to carbon atoms further apart, but not to the same carbon atom. This invention contemplates not only the use of such polyamines as diethylenetriamine, triethylenetetramine, tetraethylenepentamine, dipropylenetriamine, and the like, which can be obtained in reasonably pure form, but also mixtures and various crude polyamine materials. For example, the mixture of polyethylenepolyamines obtained by the reaction of ammonia and ethylene dichloride, refined only to the extent of removal of chlorides, water, excess ammonia, and ethylenediamine, is a very satisfactory starting material. Most preferred are the polyethylenepolyamines containing from two to four ethylene groups, two primary amine groups, and from one to three secondary amine groups.

The term "polyalkylenepolyamine" employed in the claims, therefore, refers to and includes any of the polyalkylenepolyamines referred to above or to a mixture of such polyalkylenepolyamines.

It is desirable, in some cases, to increase the spacing of secondary amine groups in the molecule of the polyaminoamide intermediate in order to change the reactivity of the polyamideepichlorohydrin complex derived therefrom. This can be accomplished by substituting an aliphatic diamine such as ethylenediamine, propylenediamine, hexamethylenediamine or a heterocyclic diamine, such as piperazine or the like, for a portion of the polyalkylenepolyamine. For this purpose, up to about 60% of the polyalkylenepolyamine may be replaced by a molecularly equivalent amount of the diamine. Usually a replacement of about 30% or less will serve the purpose.

While the intermediate condensation product obtained may, in many cases and in fact usually, be composed of mixtures of the various compositions, particularly when the starting materials are not used in a strict 1:1 mol ratio, and when the starting material consists of a mixture of polyamines, the preferred embodiment using methyl acrylate and diethylenetriamine in a 1:1 mol ratio may be considered typical and produces as its primary product a polyamino-amide of the invention by virtue of a reaction which may be considered to occur in two stages, although the second stage may occur concurrently or simultaneously with the first stage as such stage or steps are described herein.

In the first step, a Michael addition occurs in accordance with the following equation:

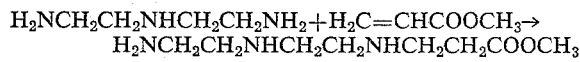

In the second step aminolysis and elimination of methanol result in the production of a linear polymer in accordance with the following equation:

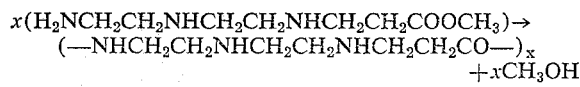

With methyl acrylate, the first step occurs at much lower temperature than the aminolysis but with methyl methacrylate the two steps occur at the same temperature. Hence, the two steps may readily be kept separate with methyl acrylate whereas in the other cases they would occur practically simultaneously. The products are essentially equivalent in either case.

The general equation for the first step reaction applying to polyalkylenepolyamines generally (including mixtures containing an alkylenediamine) and unsaturated esters generally may be represented as follows:

where:

$m$ is 1 or more, such as 1 to 6 and preferably 2 to 4,
$n$ is 2 to 6 or more, preferably 2 to 3, and most economically 2,
R is $H_2C=CH$— or $H_2C=C(CH_3)$—,
R° is a hydrocarbon residue of an alcohol, such as ($C_1$–$C_6$)-alkyl, preferably methyl, and
R' is —$CH_2CH_2$— or —$CH_2C(CH_3)H$—.

The general reaction applying to the second step is as follows:

The ester and the polyamine may be mixed with or without a solvent and the simple mixture results in an exothermic reaction even when effected at room temperature. Depending upon the quantities and the rapidity of the addition of one reactant to the other, more or less cooling may be desirable to provide a smooth reaction without overheating in portions thereof.

If desired, a basic catalyst, such as an alkali metal hydroxide or an alkali metal alcoholate such as sodium methylate may be used to assist this reaction, but it is generally unnecessary.

After the preliminary reaction, involving the Michael addition, the reaction medium is heated to cause aminolysis of the ester group of some molecules of the adducts with the amino group of others with liberation of methanol or other alcohol. The heating may range from a temperature of about 90° to 130° C., or even higher. Generally, the reaction mixture is raised to the upper portion of this temperature range to effect aminolysis and, of course, the reaction will liberate methanol or other alcohol which may be allowed to boil off and thereby favor further aminolysis.

The resulting product is a water-soluble linear condensation polymer which may contain more or less alcohol, such as methanol, depending upon the extent to which the latter is removed by distillation. It is generally highly viscous at the elevated temperature where the reaction is completed, generally around 90° to 95° C. and it has a pH value of about 10 to 11.5. Its average molecular weight may range from about 300 to 1,000 or higher, by ebulliometric methods.

The linear condensation product thus obtained is a solid at room temperature and water-soluble. It is useful as a curing agent for polyepoxides and as a water-soluble size for rendering textile yarns of any size amenable to textile opeartions. The solid can be applied from an aqueous solution having a concentration of from ½ to 5% or more so as to provide on the yarn from about ⅓ to 1.5% of the size which, upon drying, unifies the yarn and serves to protect it during textile operations such as weaving and knitting. This intermediate is also useful directly as an adhesive where subsequent removal, as in the case of yarn sizing by means of a simple washing in water or aqueous acid solutions, may be desired.

The polymeric amino-amide intermediate is adapted to be reacted with a wide variety of materials. For example, reaction thereof with an alkylene oxide and especially ethylene oxide in an amount of from 1 to 15 moles of alkylene oxide per amino group in the polymer unit serves to provide water-soluble compositions having surface-active properties and useful also as a curing agent for polyepoxides.

Another reaction product obtainable from the intermediate above is the resinous condensation product with an epihalohydrin. This reaction product is of thermosetting character and is useful in quite a variety of applications as will be explained hereinafter.

While epibromohydrin or epiiodohydrin may be used for producing these thermosetting condensation products, it is preferred from the standpoint of cost and availability to employ epichlorohydrin and discussion herein will specifically refer to this halohydrin.

The resinous condensation products of thermosetting character may be produced by the reaction of as low as 0.2 mol of epichlorohydrin per mol of original polyamine used in the making of the polyaminoamide intermediate. It is, however, within the scope of the invention to use as much as $m$ moles of epichlorohydrin per mole of original polyamine used in making the polyamide, the letter $m$ representing the same value as that which it is used to represent in the formula for the initial polyamine used in making the intermediate. Thus, in the case of the intermediate obtained from diethylenetriamine, the mol ratio may be from 0.2 to 2 moles epichlorohydrin per mole of the polyamine. Similarly, in the case of triethylenetetramine, the range may be from 0.2 to 3 moles of epichlorohydrin per mole of the polyamine, since in this case $m$ is 3.

To effect the reaction between the epihalohydrin and the polyamide intermediate, the halohydrin is preferably added gradually to an aqueous solution of the polyamide at a temperature which may be from room temperature to reflux temperature. The concentration of the aqueous solution may vary widely, 10 to 40% being quite practical.

Preferably the temperature is about 50 to 75° C. During the reaction when a high concentration material is used at the start, it may be desirable to gradually dilute the reaction mass to reduce the viscosity so that mixing and uniformity of the reaction mass are facilitated.

If desired, a hydrogen chloride acceptor such as caustic soda may be added, but this is generally unnecessary and it is preferred to avoid its use because it tends to remove the epichlorohydrin before it can react with the polyamide. When it is used, however, it should be added slowly along with the epichlorohydrin.

The reaction is carried on until the viscosity of the reaction mass reaches a value in the range of about 3 to 45 poises or about M to Z on the Gardner-Holdt scale when measured at 25% concentration at 25° C. During the reaction, the pH drops to about 7–9 when no caustic is used.

It is clear that the thermosetting resin condensates thereby obtained embrace a wide range of compositions depending upon the starting materials and the particular mol ratios employed as well as the extent of reaction. The materials obtained have a wide variety of uses such as introduction into paper pulps for the imparting of wet-strength to the final paper and use as a flocculant. When used as a flocculant, the composition may simply be added to liquid media and especially aqueous media in which the condensation product is soluble and in such media a very small amount serves to cause flocculation and precipitation of suspended matter whether of organic or inorganic character. The amount of the condensation product needed for this purpose may be from 0.001 to 0.5% by weight based on the weight of the suspended matter that it is intended to remove from the liquid medium.

The resin composition may also be used to aid in the sizing of papers. For this purpose, a small amount of the resinous condensation product may be added to the paper pulp into which the sizing material is introduced.

The resinous condensation product of the present invention is also applicable as a binder for bonding the fibers of non-woven webs and fabrics, as a stiffener for textile fabrics, and as an antistatic agent for the treatment of textiles or of any other articles formed of hydrophobic polymeric materials which tend to develop static electricity on friction or rubbing contact.

As stated hereinabove, the resinous condensation product is water-soluble and is thermosetting in character. When the composition is to be applied in any of the various ways mentioned hereinabove, it may be applied as an aqueous solution of neutral, slightly alkaline, or of acid character. Frequently, it may be desirable to lower the pH of the solution to a value of 4 to 5 before application by the addition of an acid such as hydrochloric acid, sulfuric acid, acetic acid, phosphoric acid, or formic acid.

It has been found that for the imparting of wet-strength to paper, those condensation products in which the mol ratio of epichlorohydrin to the linear polyamide is from 0.9 to 0.75 mmoles per mole of the original polyamine give the most advantageous results. Thus, in the case of a condensation product of epichlorohydrin and a polyamide derived from diethylenetriamine, the preferred mol ratio is from 0.9 to 1.5 moles of the halohydrin to the triamine.

For most flocculant purposes, such as in the sizing of papers with such materials as rosin, rosin and alum, or polyvinyl resins, the preferred proportions are in the range of 0.2 to 0.7 mol of epichlorohydrin to each mol of original polyamine used in making the polyamide and the preferred viscosity range of the resinous condensation product is about 5 to 6 poises or from about R to U on the Gardner-Holdt scale at 25% solids and 25° C.

When the composition is employed for the imparting of wet-strength, it is desirable to hasten the curing of the treated paper by subjecting it to a temperature ranging from 220° F. to 450° F. This heating step may be applied immediately after the paper has been dried and the normal drum drying equipment can be employed for this purpose. Likewise, when the resinous condensation product is applied for other purposes, as in the sizing of papers, binding of fibers in non-wovens, and as stiffeners or antistatic agents for textiles or other materials, the treated materials are desirably subjected to an elevated temperature in the range just specified for a period of one-half minute to five minutes or so to accelerate the curing of the resin. However, even without such heat-accelerated cures, the resin on the treated articles will gradually thermoset as a result of aging even at the customary temperatures which prevail during storage of the treated article.

The resinous condensation product obtained from the epihalohydrin and the aminolyzed polyalkylenepolyamine-ester adduct may also be modified by reaction with an alkylene oxide. For example, reaction thereof with an alkylene oxide, and especially ethylene oxide or propylene oxide in an amount of 1 to 50 mols of alkylene oxide per amino group provides products of high molecular weight, including water-soluble to water-dispersible compositions having surface-active properties and useful as flocculants.

In the following examples which are illustrative of the invention, the parts and percentages are by weight unless otherwise indicated:

*Example 1*

(*a*) To 1650 grams of commercial diethylenetriamine was added gradually 1290 grams of methyl acrylate containing 40 grams of 25% sodium methoxide. The contents were stirred, and the temperature was allowed to get as high as 127° C. After six hours of refluxing, the temperature dropped down to 90° C. due to the liberated methanol. The methanol was then allowed to distill off at atmospheric pressure until the temperature of the condensate reached 110° C. This temperature was not exceeded. Removal of the remainder of the methanol was done under water-pump vacuum. There was obtained 538 grams of distillate from the above reactants.

The condensate was then treated with water to make up a 70% solids solution with a viscosity of Z4+ on the Gardner-Holdt scale or a 40% condensate solids solution having a viscosity of C. The pH of the 70% condensate solution was found to be 10.8.

(*b*) Part (*a*) was repeated except the maximum temperatures of refluxing was 113° C. giving a product of which the Gardner-Holdt viscosity was B+ at the 40% level.

(*c*) Part (*a*) was repeated with similar results substituting 2350 grams of triethylenetetramine for the diethylenetriamine.

(*d*) One hundred and seventy-two grams of the 70% condensate solution obtained in part (*a*) hereinabove was diluted further with 172 grams of water. To this solution at about 75° C. was added epichlorohydrin in small increments until the Gardner-Holdt viscosity was greater than Z. At this point, the solution was cooled with an ice bath and 50 grams of 25% $H_2SO_4$ was added to prevent gelation. The amount of epichlorohydrin used was 30.8 grams. The viscosity of this 26% resin solution was Z on the Gardner-Holdt scale. The resin was further diluted by the addition of 100 grams of water. The solution at 25% solids and 25° C. had a viscosity of 42 poises.

To 127.5 grams of the above solution was added 32 grams of 25% sulfuric acid to bring the pH down to 4.3 and the resin solids to 21%. The Gardner-Holdt viscosity was S+.

(*e*) Part (*d*) was repeated using the 40% solution of part (*b*). The product had a viscosity at 25% solids and 25° C. of 5 poises.

(*f*) Part (*d*) was repeated using a 70% solution of the condensate of part (*c*). The product at 25% solids and 25° C. had a viscosity of 38 poises.

*Example 2*

To 248 grams of a 15% resin solution at a temperature of 70–80° C. (obtained from methyl acrylate, diethylene triamine, and epichlorohydrin as described in Example 1(*d*) in a special flask made for low pressure reactions, there was added 25.5 grams of ethylene oxide over a four-hour period. The resulting 22.9% ethylene oxide-modified resin solution was found to have a pH of 7.6 and a viscosity of 3 poises and was free of unreacted ethylene oxide.

*Example 3*

(*a*) Twelve hundred grams of methyl methacrylate were added to 1320 grams of diethylenetriamine with stirring. Heat was applied until about 60–70° C. at which point the exotherm raised the temperature to 95° C. Heat was then applied to total reflux (142° C.). The reflux temperature dropped gradually to 96° C. over an eight-hour period due to the formation of methanol. The alcohol was then removed at atmospheric pressure and the last traces of alcohol removed under vacuum. The temperature of the reaction medium was maintained in the 110–120° C. range during the distillation. When all of the methanol was removed, water was added to the condensate to bring the condensate solids to 81%. At 25% solids and 25° C., the resin had a viscosity of 6 poises.

(*b*) To 272 grams of the condensate obtained in part (*a*) at 81% resin solids was added 358 grams of water, and the solution was heated and maintained at 75° C. Ninety-six grams of epichlorohydrin and 78 grams of 50% aqueous NaOH solution was added very slowly in such a manner that the base was always behind or near the equivalence point of the epichlorohydrin. Water (307 grams) was added from time to time to lower the solids concentration. When the viscosity reached 6 poises measured at 25° C. and 25% resin solids concentration, the reaction was terminated by cooling and adding 214 grams of 25% $H_2SO_4$. The solution then was at 21% resin solids with a pH of 5.6.

*Example 4*

This example illustrates the usefulness of the condensation products of the present invention as aids in the sizing of paper. For comparison purposes, sized paper was prepared from a commercial product composed of rosin size fortified with a rosin-maleic acid adduct. The sized sheets were tested for degree of sizing by determining the time required for a drop from 100% to 70% reflectance of the bottom face of the sheet on whose upper face 4 ml. of a conventional blue-black permanent writing ink was placed within a circular dam of 1 3/16" diameter. The longer the time the more effective the sizing.

One control sheet was prepared by mixing into a bleached sulfite pulp at 10% consistency and having a Canadian Freeness of 465 ml., an amount of a rosin-maleic acid adduct-fortified rosin size to equal to 2% on the weight of the dry fiber content of the pulp, then mixing into the size-containing pulp an amount of a 6% papermarker's alum solution to provide 3% alum, based on the dry fiber weight, diluting with water (adjusted to a pH of 5 with sulfuric acid) to a consistency of 0.125%, then forming a sheet, and drying it at 200° F. for 2 minutes to a moisture content of 6%. Another control was prepared in he same way except that the amount of fortified size was increased from 2% to 3%. Both control sheets and the sheets prepared below had a 38 lb. basis weight (total weight of 500 sheets 24 inches x 36 inches).

Other sheets were prepared by the same procedure except that the fortified rosin size was replaced by various amounts (indicated in the table below) of a regular unfortified rosin size and after mixing in the rosin size but before adding the 3% alum, various amounts (percent solids on dry fiber weight as indicated in the following table) of the condensation product of Example 1(*d*) were mixed in. The following table gives the sizing results obtained:

TABLE A

| Sheet | Size | Size Level Percent on Dry Fiber | Additive (Ex. 1 (d)) Percent Solids on Dry Fiber | Time for Penetration, Seconds |
|---|---|---|---|---|
| 1 | Fortified rosin | 2 | | 230 |
| 2 | do | 3 | | 410 |
| 3 | Rosin size | 1 | 0.2 | 240 |
| 4 | do | 1.5 | 0.1 | 350 |
| 5 | do | 1.5 | 0.15 | 500 |
| 6 | do | 1.5 | 0.2 | 642 |

*Example 5*

There was added to a bleached sulfite pulp, having a Canadian Freeness of 470 ml. and consistency of 1%, 2% by weight, based on dry fiber weight, of the condensation product of Example 3(*b*). After thorough mixing and diluting to a consistency of 0.125%, a 35-pound basis weight sheet was formed, drying being effected at 200° F. for 2 minutes to a moisture content of about 6%. After ageing the sheet various periods the wet strength was determined by first soaking the sheet in water 1 hour at room temperature, blotting off excess moisture and then measuring the tensile strength. The results were:

Age: Tensile strength (lb./in. width)
1-day _____ 4.9
7-day _____ 5.6
28-day _____ 5.8

Similar results are obtained using the condensation products of Examples 1(*d*), 1(*e*), and 1(*f*).

*Example 6*

Twenty-five p.p.m. (parts per million) of alum were added to a natural turbid water from the Delaware River containing 119 p.p.m. of turbidity. The mixture was stirred 5 minutes at 100 r.p.m. and then 15 minutes at 30 r.p.m. Then the suspension was allowed to settle and aliquot portions of the supernatant were removed and measured for turbidity after 0.5 minute and 15 minutes settling times. The measurements were 53 p.p.m. (0.5 min. settling) and 2.5 p.p.m. (15 min. settling). With the addition of about 0.63 p.p.m. of the condensate of Example 1(*d*) in addition to the alum, the turbidity was reduced to 25 p.p.m. after 0.5 min. settling. When 15 p.p.m. of a bentonite clay is added in conjunction with 25 p.p.m. alum and 0.63 p.p.m. of the condensate of Example 1(*d*), the turbidity was reduced to 18 p.p.m. after 0.5 min. settling and to 1.2 p.p.m. after 15 min. settling.

I claim:
1. A method for producing a solid, water-soluble, thermosetting resin-forming product which comprises reacting by mixing at a temperature from room temperature to about 75° C., (1) epichlorohydrin and (2) an aqueous solution of a solid, water-soluble linear polyamine-polyamide condensation product, having an average molecular weight of about 300 to 1,000, of methyl acrylate and a polyethylenepolyamine in a 1:1 mol ratio, the proportion of epichlorohydrin being from at least 0.2 mol up to about one mol of epichlorohydrin for each mol of the original polyamine used, the reaction being continued until the reaction product has a viscosity of about 3 to about 45 poises at 25% solids in water and at 25° C.

2. A method for producing a solid, water-soluble thermosetting resin-forming product which comprises reacting by mixing at a temperature from room temperature to about 75° C., (1) epichlorohydrin and (2) an aqueous solution of a solid, water-soluble linear polyamine-polyamide condensation product, having an average molecular weight of about 300 to 1,000, of methyl acrylate and diethylenetriamine in a 1:1 mol ratio, the proportion of epichlorohydrin being from 0.2 to 2 mol per mole of original polyamine, the reaction being continued until the reaction product has a viscosity of about 3 to about 45 poises at 25% solids in water and at 25° C.

3. A method for producing a solid, water-soluble thermosetting resin-forming product which comprises reacting by mixing at a temperature from room temperature to about 75° C., (1) epichlorohydrin and (2) an aqueous solution of a solid, water-soluble linear polyamine-polyamide condensation product, having an average molecular weight of about 300 to 1,000, of methyl acrylate and diethylenetriamine in a 1:1 mol ratio, the proportion of epichlorohydrin being from 0.9 to 1.5 mols per mol of original polyamine, the reaction being continued until the reaction product has a viscosity of about 3 to about 45 poises at 25% solids in water and at 25° C.

4. A method for producing a solid, water-soluble thermosetting resin-forming product which comprises reacting by mixing at a temperature from room temperature to about 75° C., (1) epichlorohydrin and (2) an aqueous solution of a solid, water-soluble linear polyamine-polyamide condensation product, having an average molecular weight of about 300 to 1,000, of methyl acrylate and diethylenetriamine in a 1:1 mol ratio, the proportion of epichlorohydrin being from 0.2 to 0.7 mol per mol of original polyamine, the reaction being continued until the reaction product has a viscosity of about 5 to about 6 poises at 25% solids in water and at 25° C.

5. As a composition of matter, a water-soluble solid thermosetting resin-forming reaction product obtained by the mixing, at a temperature in the range from room temperature to reflux, of (1) epichlorohydrin with (2) an aqueous solution of a condensation product of methyl acrylate and a polyethylene-polyamine in a mol ratio of about 1:1 comprising a compound of the formula

$(-NH(CH_2CH_2NH)_mCH_2CH_2CO-)_x$ in which $m$ is an integer having a value of 2 to 4, and $x$ has an average value such as to provide an average molecular weight of about 300 to 1,000, the ratio of the epichlorohydrin to the condensation product being 0.2 mol to 2 mol of the former to each mol of polyamine used in making the condensation product, the reaction being carried on until the reaction product has a viscosity of about 3 to about 45 poises at a concentration of 25% in water at 25° C.

6. As a composition of matter, a water-soluble solid thermosetting resin-forming reaction product obtained by the mixing, at a temperature in the range from room temperature to reflux, of (1) epichlorohydrin with (2) an aqueous solution of a condensation product of methyl acrylate and diethylenetriamine in a mol ratio of about 1:1 and having the formula

$(-NH(CH_2CH_2NH)_2CH_2CH_2CO-)_x$ in which $x$ has an average value to provide an average molecular weight of about 300 to 1,000, the ratio of the epichlorohydrin to the condensation product being 0.2 mol to 2 mol of the former to each mole of the original polyamine, the reaction being carried on until the reaction product has a viscosity of about 3 to about 45 poises at a concentration of 25% in water at 25° C.

7. As a composition of matter, a water-soluble solid thermosetting resin-forming reaction product obtained by the mixing, at a temperature in the range from room temperature to reflux, of (1) epichlorohydrin with (2) an aqueous solution of a condensation product of methyl acrylate and diethylenetriamine in a mol ratio of about 1:1 and having the formula

$(-NH(CH_2CH_2NH)_2CH_2CH_2CO-)_x$ in which $x$ has an average value to provide an average molecular weight of about 300 to 1,000, the ratio of epichlorohydrin to the condensation product being 0.9 mol to 1.5 mol of the former to each mole of original polyamine, the reaction being carried on until the reaction product has a viscosity of about 3 to about 45 poises at a concentration of 25% in water at 25° C.

8. As a composition of matter, a water-soluble solid thermosetting resin-forming reaction product obtained by the mixing, at a temperature in the range from room temperature to reflux, of (1) epichlorohydrin with (2) an aqueous solution of a condensation product of methyl acrylate and diethylenetriamine in a mol ratio of about 1:1 and having the formula $$(-NH(CH_2CH_2NH)_2CH_2CH_2CO-)_x$$

in which $x$ has an average value to provide an average molecular weight of about 300 to 1,000, the ratio of the epichlorohydrin to the condensation product being 0.2 mol to 0.7 mol of the former to each mol of the original polyamine, the reaction being carried on until the reaction product has a viscosity of about 5 to about 6 poises at a concentration of 25% in water at 25° C.

References Cited by the Examiner
UNITED STATES PATENTS

| | | | |
|---|---|---|---|
| 2,146,210 | 2/1939 | Graves | 260—78 |
| 2,998,295 | 8/1961 | Goldann | 260—78 |

WILLIAM H. SHORT, *Primary Examiner.*

J. R. LIEBERMAN, *Examiner.*

T. D. KERWIN, *Assistant Examiner*